(12) United States Patent
Skarzenski et al.

(10) Patent No.: US 6,170,298 B1
(45) Date of Patent: Jan. 9, 2001

(54) GLASS SPINNER WITH PARTITIONED SPINNING HEAD

(75) Inventors: Joseph Skarzenski, Ottawa; Witold S. Czastkiewicz, Orleans; Andrzej Nasiorowski, Nepean; Erkki Paivinen, Ottawa, all of (CA)

(73) Assignee: Ottawa Fibre Inc. (CA)

( * ) Notice: Under 35 U.S.C. 154(b), the term of this patent shall be extended for 0 days.

(21) Appl. No.: 09/302,450

(22) Filed: Apr. 30, 1999

(51) Int. Cl.⁷ .................................................. C03B 37/04
(52) U.S. Cl. ................ 65/521; 65/515; 65/516; 425/8; 425/131.5; 425/192 S; 264/8
(58) Field of Search ............................. 65/455, 456, 469, 65/470, 515 T, 516, 521; 264/8; 425/8, 131.5, 192 S

(56) References Cited

U.S. PATENT DOCUMENTS

| | | | |
|---|---|---|---|
| 1,294,909 | * | 2/1919 | Howell . |
| 3,190,736 | * | 6/1965 | Benner . |
| 3,254,482 | * | 6/1966 | Stalego . |
| 5,312,469 | * | 5/1994 | Houston . |
| 5,482,527 | * | 1/1996 | Czastkiewicz . |
| 5,523,032 | * | 6/1996 | Ault et al. . |
| 5,591,459 | * | 1/1997 | Snyder . |
| 5,779,760 | * | 7/1998 | Watton et al. . |
| 5,785,996 | * | 7/1998 | Snyder . |

FOREIGN PATENT DOCUMENTS

703196 A1 * 3/1996 (EP) .

* cited by examiner

*Primary Examiner*—Stanley S Silverman
*Assistant Examiner*—Michael P. Colaianni

(57) ABSTRACT

A fiberizer has a spinning head that is partitioned to create separate extrusion zones for fiber formation. Molten feed stock is allocated between the zones to promote a greater formation of fiber of having a narrow spectrum of fiber diameters.

7 Claims, 7 Drawing Sheets

GLASS SPINNER WITH PARTITIONED SPINNING HEAD

FIELD OF THE INVENTION

This invention relates to the production of glass fibres. In particular, it relates to an improved spinning head within a fiberizer having a more extended lifetime of use and greater capacity in producing such fibres, and particularly fibres having fine diameters of consistent dimensions.

BACKGROUND TO THE INVENTION

Glass fibres are produced by spinning molten feed-stock to force the extrusion of fibre-forming streams of molten glass under centrifugal forces from the periphery of a spinning head. The spinning head used in this process has a circumferential extrusion rim with a spinning face surface pierced by orifices through which the molten fluid is forced.

Particularly in the case of glass, the constant flow of a high temperature thermoplastic melt through the orifices leads to corrosion and to erosion of the orifices. The extrusion orifices or holes are chosen to be of a preferred diameter in order to control the diameter of the fibres. Maintaining constant fibre diameter is a critical factor in the production of fine fibres and the production of consistently fine fibres is highly desirable. Once the extrusion holes are oversize, these objectives are not met and eventually, a worn spinning head must be replaced.

Due to the difficulties in maintaining relative evenness in the throughput of extrusion orifices and similar overall fiber-forming conditions, the extrusion rims on conventional spinning heads have been limited in their relative height (see U.S. Pat. No. 4,359,444 at column 1, lines 33–35). This prior art limitation that the height of the spinning face be kept minimal has assured that the extrusion orifices distributed over the surface of the extrusion rim are largely operating to produce fiber product with a relatively narrow fiber diameter distribution spectrum until wear of the orifices disrupts this balance.

To achieve an increase of productivity from fiberizers, a trend has developed of providing larger capacity by increasing the head diameter, and correspondingly increasing the circumferential surface area of the spinning face at the extrusion rim. However, upgrading production equipment by this means is expensive because it requires building a new environment of support peripherals for each head, designed to accommodate an increased diameter.

A need exists to permit the increase of production capacity from a fibre spinning head without significantly increasing the diameter of the head.

It is known to produce fibres using a partitioned spinning head wherein two different feed-stocks are fed to common extrusion orifices to form helical fibres. The two feeds are chosen to have differing coefficients of thermal expansion—shrink factors—so that on cooling the single fibre of binary composition naturally curls into the form of a helix. A prior art disclosure of a spinning head of this type is depicted in U.S. Pat. No. 5,482,527 issued Jan. 9, 1996.

In this reference the spinning head is partitioned to receive two separate streams of molten material, fed into the spinning head at two separate radial distances from the central axis of the head. A first stream, which is delivered at the smaller radial distance, is deposited on the bottom surface or floor of the spinning head. The second stream, which is delivered at a larger radial distance, is deposited on a mid-level, annular platform that keeps the second feed-stock separated from the first.

Both molten compositions are flung outwardly under centrifugal force towards the orifice-containing rim of the partitioned spinning head. At the rim, separated pathways formed in the head allow the two molten compositions to merge in pairs at multiple extrusion orifices to form a binary extruded filament. These filaments are directed by high velocity gas jets and gravity to fall downwardly, solidifying, as a veil. The fibres become attenuated in their diameter in the process, and break at intervals into fibre segments of acceptable lengths.

In this prior art arrangement, balanced flows of molten feed-stock are delivered to the dual-access orifices to provide a consistent ratio of delivered components to each fibre. This ratio need not be equal but, in this prior art reference, this ratio is not expected to vary over time or between orifices. No attempt is made to create distinct fibre-forming zones on the spinning face of the extrusion rim.

Another reference that premises the reception of two, distinct, but continuous feed-stocks of molten material is U.S. Pat. No. 5,582,841 to Watton et al. In this reference an annular partition wall mounted centrally above the floor of the spinner initially maintains separation between the two feed-stocks. In one embodiment the separate flows are delivered to paired extrusion outlets to form dual component fibres. Alternately, the observation is made (column 2, lines 60–65) that these flows may be kept separate in order to form single-component fibres. An objective of this reference, however, is to maintain an even distribution of mass behind all of the extrusion orifices (column 3, lines 10–12).

This arrangement is not otherwise depicted or discussed in the disclosure. Nor are the extrusion orifices from the two glass streams kept separate in non-overlapping zones.

This reference does not suggest that the glass fibre production apparatus be otherwise modified. The same supporting hardware is to be employed: two classes of glass melt, two bushings supply glass from separate forehearths, and the spinning head has intermixed extrusion orifices producing fibre at presumably similar rates into a common attenuation environment. Accordingly, the two glass streams would produce fibres, albeit of different types of glass, under common fiberizing conditions. No suggestion is made to provide a single, common supply of glass and to physically divide the single melt into separate parts that are then delivered to different fibre forming zones with different fiberizing conditions within a common spinning head.

Further references having a similar structure are U.S. Pat. Nos. 5,468,275 and 5,474,590, both to Lin et al. and U.S. Pat. No. 3,190,736 to Benner which similarly addresses the objective of evenly delivering molten material to a common set of extrusion orifices by providing multiple pathways for such material to arrive at the outside extrusion rim.

The objective of evenly distributing hot, thermoplastic feed-stock over the extrusion orifices is addressed in U.S. Pat. No. 3,254,482 to Stalego. In this reference a single flow of glass is delivered to various elevations within the spinning head by an interior rotating distributor disk. This disk, which turns at a different rate from the spinning head, delivers molten material both horizontally from a horizontally-oriented portion of its circular surface, and upwardly, along inclined, conical portions of its circular surface. These conical portions have differing angles of inclination thereby delivering the molten flow to different elevations along the inside surface of the outer circumferential wall of the spinner. As depicted, however, the molten feed-stock deposited over the inside surface of the rim-wall is evenly distributed (column 4, lines 60–65); column 5, lines 17–21).

Thus, in all of these prior art reference a focus is maintained on delivering feed-stock to the extrusion orifices on an evenly-distributed basis. Absent from these references is a recognition that the production of extruded fibres from orifices pierced through an annular rim provides zones that are more favourable, and zones that are less favourable to fiber formation.

No proposals have been made to exploit the possibilities of increasing the vertical height of the extrusion rim to provide space for more extrusion orifices, while partitioning the glass flow to exploit the more favourable fiber production zones. Such a procedure, if it could be made to work, would increase the output of a spinning head without having to enlarge the diameter of the head to provide more room on the extrusion rim to carry additional extrusion orifices.

Accordingly, it is an object of this invention to produce a new configuration for a fibre spinning head that provides for differential control over the rates of extrusion of fibres from differing levels of the extrusion rim of the spinning head. Further, the invention provides a means by which the vertical height of the extrusion rim on a fibre spinning head may be extended in order to provide more extrusion orifices and increase the production capacity of a spinning head.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

It is a feature of this invention that the useful life of a spinning head can be increased by partitioning the delivery of molten glass and providing for delivery of different quantities of glass to distinctly separated zones, e.g. the upper and lower regions, of the spinner face.

According to one feature of the invention, a fibre spinning head having a circumferential extrusion rim with a spinning face perforated by extrusion orifices is fed with a single type of molten glass (or other extrusion material) from two or more separated, vertically displaced, non-intercommunicating, interior compartments that deliver the molten glass on the inner side of the extrusion rim to different extrusion zones. Differing quantities of molten material are allowed to accumulate in the respective compartments to provide allow for pressure heads to form from the molten material being fed to the orifices associated with each compartment.

As the feed compartments are vertically displaced with respect to each other, the corresponding extrusion orifices associated with each compartment are also vertically displaced from each other, forming separate classes of orifices that are physically separated from each other in distinct extrusion zones. The result is that the extrusion rim has vertically separated zones of extrusion orifices that are fed with molten glass along separate pathways. Advantageously, the invention admits to the possibility of allocating a greater proportion of the glass melt to the upper extrusion zones.

When only two feed compartments are employed, the molten material passing through the respective compartments may be exposed to separate temperature controlled environments. Thus, the molten glass (material) in the lower compartment can be heated from below by an under-the-spinning-head bottom burner or equivalent heating means. This provides increased flexibility in controlling the extrusion rates for each class of extrusion orifices.

A principal idea behind the invention is to create two (or more) physically separated, and to some extent, independently operated fibre-forming zones over the range of the height of the spinning face on the extrusion rim. The inner surface of the extrusion rim of the spinning wheel is preferably bifurcated into two (or more) zones by an inner circumferential flange(s). According to one method of delivery, molten glass mass is directed alternately into each of the compartments feeding the respective fibre-forming zones, and this is effected in a specifically selected mass distribution ratio. Each zone operates to some extent independently; there is no direct communication between them. It is, therefore, possible to operate the separate zones and corresponding classes of extrusion orifices at different pressure heads (the pressure arising from the thickness of the molten glass layer flung against the extrusion rim by centrifugal force in each respective compartment) to provide different mass flow rates for each fibre-forming zone.

In order to produce fiber with a narrow fiber diameter distribution spectrum the fiberizing load assigned to orifices at different heights within the head is adjusted to match the fiberizing conditions in each respective zone. Zones with superior fiber-forming capabilities (top ones, close to the main burner) are assigned a heavier fiberizing load than their lower counterparts. Preferred distribution ratios between lower and upper compartments of a two zone head are 40:60 or 35:65 (lower to upper) in terms of mass flow rate ratios.

In one preferred embodiment the spinning head of the invention is fed with molten material from a single source stream, the molten material being delivered to respective compartments by circularly rotating, flow directing surfaces that intercept the stream intermittently as the spinning head rotates. This option may be employed in place of delivering two or more glass streams from separate bushings.

As an alternative, a single intermediate compartment-dividing annular plate may receive a single stream of glass. The glass, once so received, is then distributed between the upper and lower compartments by intermittent openings in the annular plate that allow a portion of the received glass to flow downwardly into the lower compartment.

By a further feature of the invention, the temperature of the molten material in the bottom-most interior compartment of the spinning head may be supplementally adjusted by applying heat to the bottom surface of the spinning head. Preferentially, this is achieved by locating a combustion gas burner element beneath the spinning head. The use of such a heat source provides some degree of control over the rate of extrusion of glass through the lower zone of orifices on the spinning head.

The benefits of the invention are:
(1) an increase in fibre-forming capacity by having an extended face surface on the spinning head, allowing more than one, fully separated, fibre-forming zone to be present in a fiberizing centrifuge designed to produce single-component glass fibres;
(2) a more uniform rate of erosion of extrusion orifices is achieved, thus providing fibres of more uniform diameter;
(3) it becomes possible to utilize extrusion orifices of smaller diameter to produce correspondingly finer fibres (this arises from the greater uniformity of fibre diameter provided by the invention); and
(4) a longer lifetime for spinning heads is achieved in terms of total output before replacement due to worn, oversized orifices becomes necessary.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
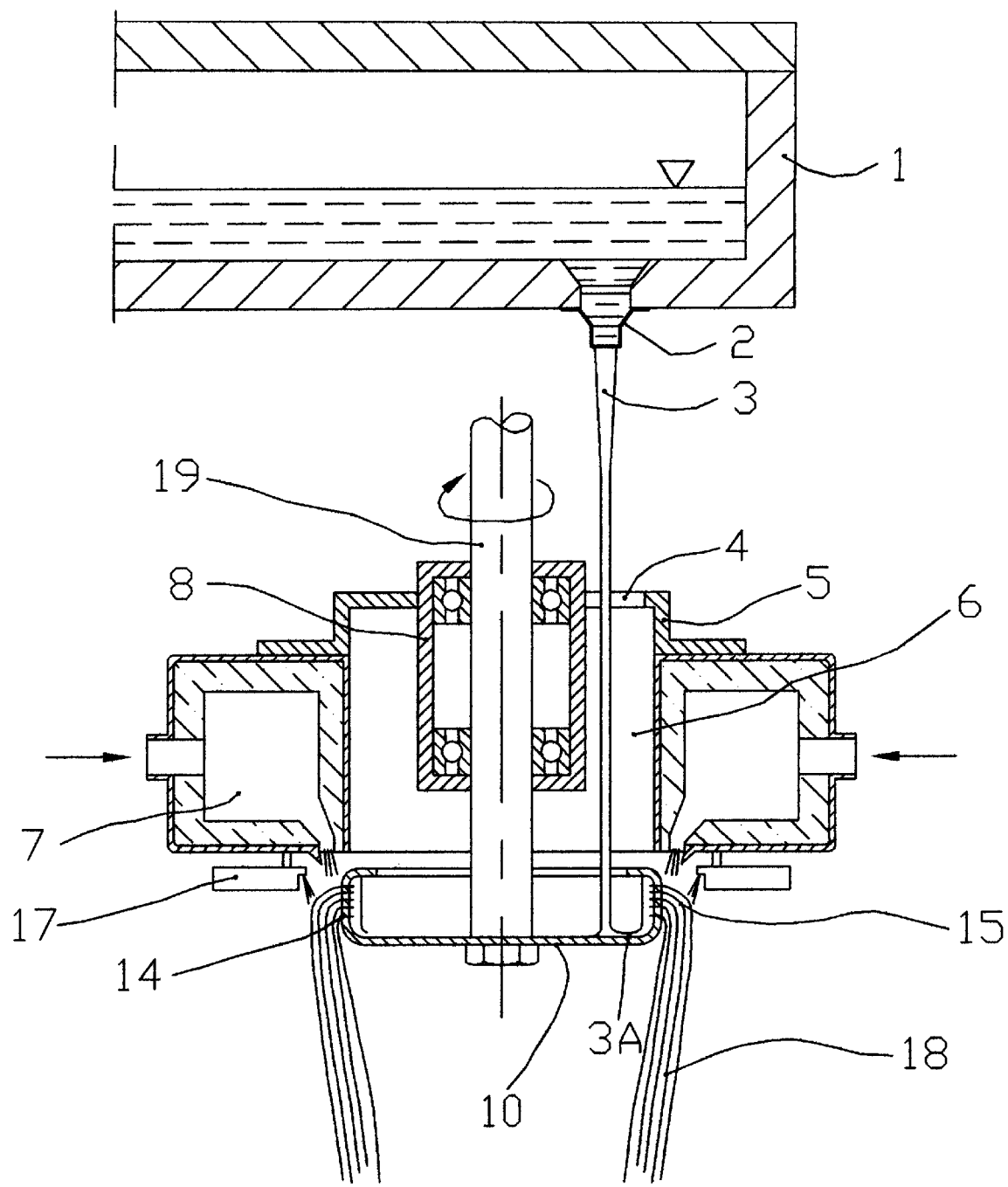
FIG. 1 is a side cross-sectional view of a molten glass stream being fed into a prior art spinning head.

In the conventional arrangement of FIG. 1 molten glass from a forehearth 1 flows due to gravity through an electrically heated 90% platinum—10% rhodium alloy bushing 2. Bushing 2 works as a sort of flow controlling device for molten glass. A molten glass stream 3 forms, gradually accelerating, and reducing in its diameter as it travels downwardly from bushing 2. On its path downward, the glass stream 3 passes through a cut-out area 4 in fiberizer top plate 5, and further moves down through annular cavity 6. Cavity 6 is formed between the annular external (main) burner 7 and bearing housing 8. The glass stream 3, continuing down, enters the rotating, open-from-the-top, conventional spinning head 10.

Conventional means, such as an electric motor (not shown) with some step-up belt drive system, is used to drive spinning head 10 through mounting shaft 19. Driven shaft 19 is supported by the bearing housing 8.

Under the influence of centrifugal force, molten glass 3A flows radially outwards, to the extrusion rim and then through a multiplicity of tiny holes or orifices. These holes are typically laser-drilled in the spinning head peripheral wall or extrusion rim 14. The extruding glass emerges outside of the rim 14 as an array of primary fibres 15. These primary fibres 15, on their way to become secondary fibres 18, are subject to extensive attenuation by the combined action of the mass of fibre being spun by mechanical effect from the high speed rotating spinning head and aerodynamic drag on the fibre originating from both main burner 4 and blower 17 which together generate a gaseous flow field. Secondary fibre 18 forms the basis for further, subsequent, processing steps (not shown).

Figure 2:
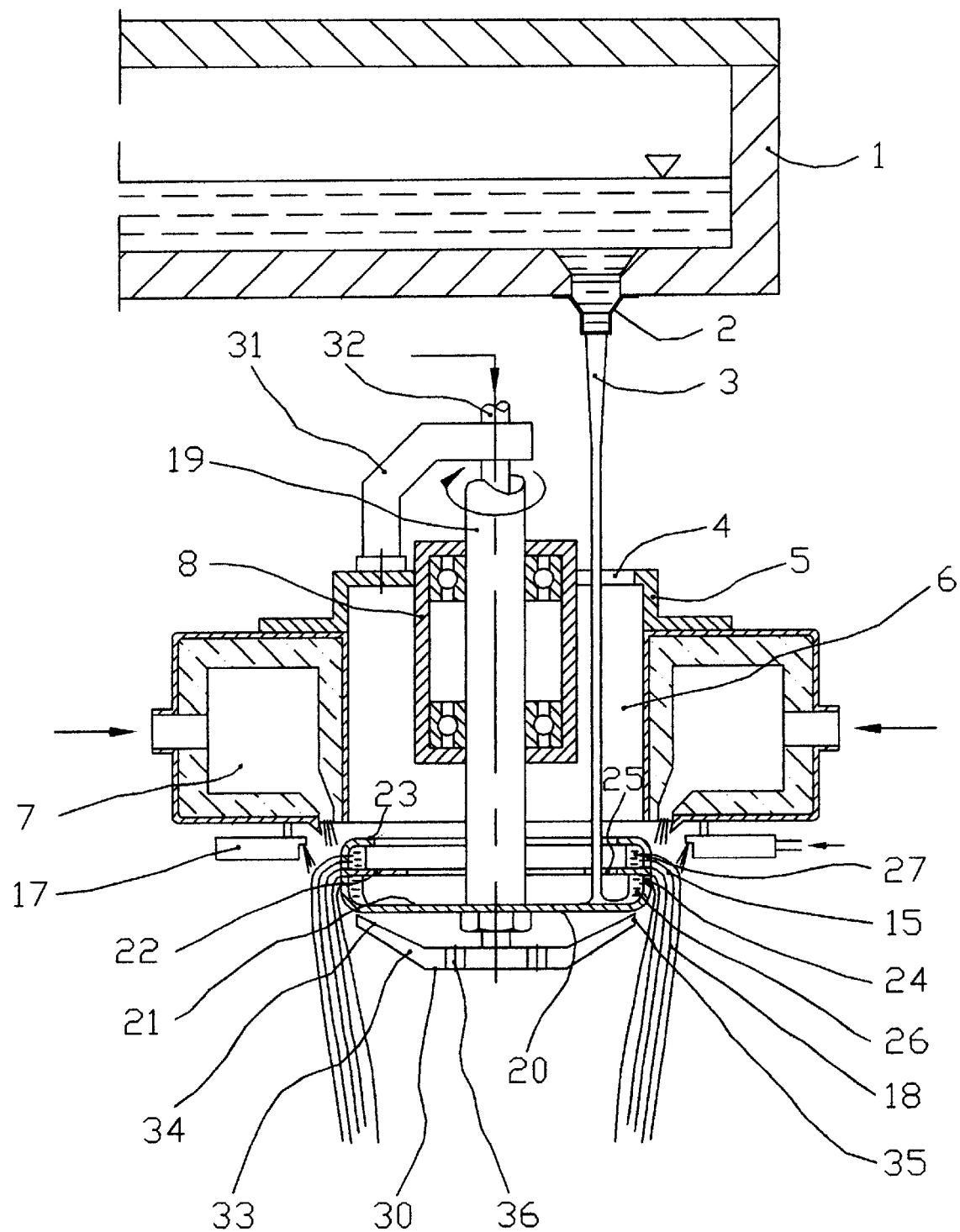
FIG. 2 is a side cross-sectional view of a spinning head in accordance with the invention.
Figure 3:
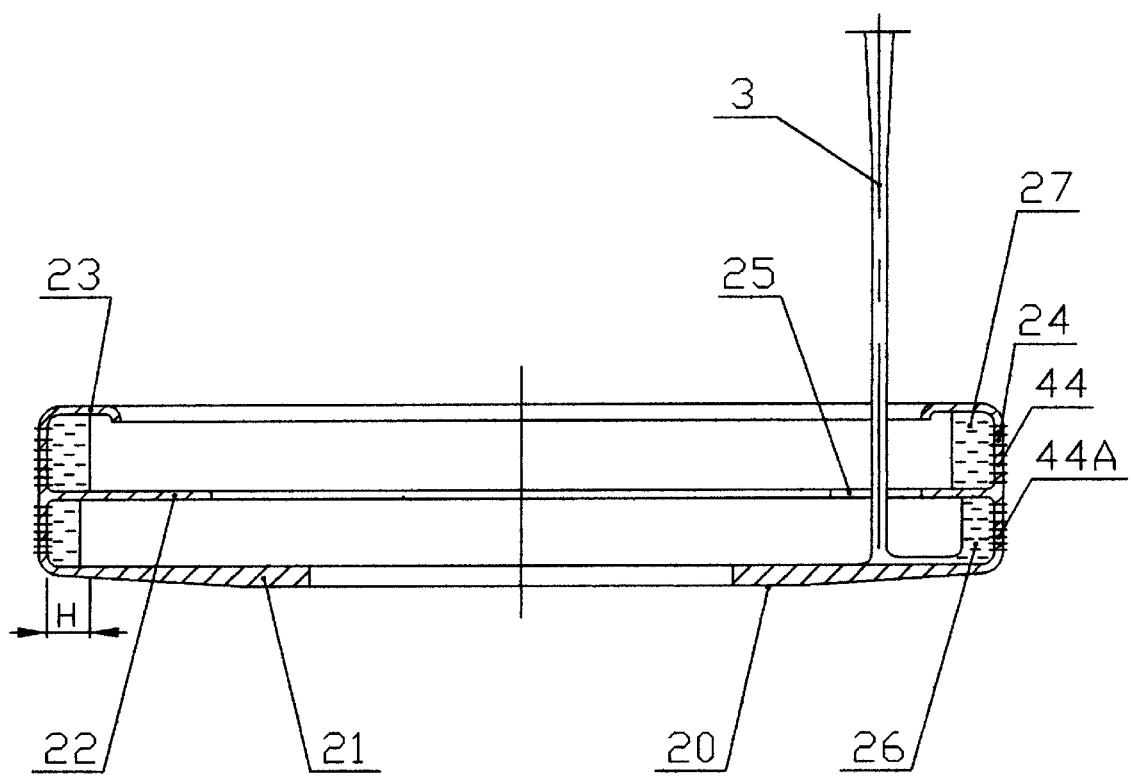
FIG. 3 is a detailed, close-up side cross-sectional view of the spinning head of FIG. 2 showing dual, separate compartments.
Figure 4A:
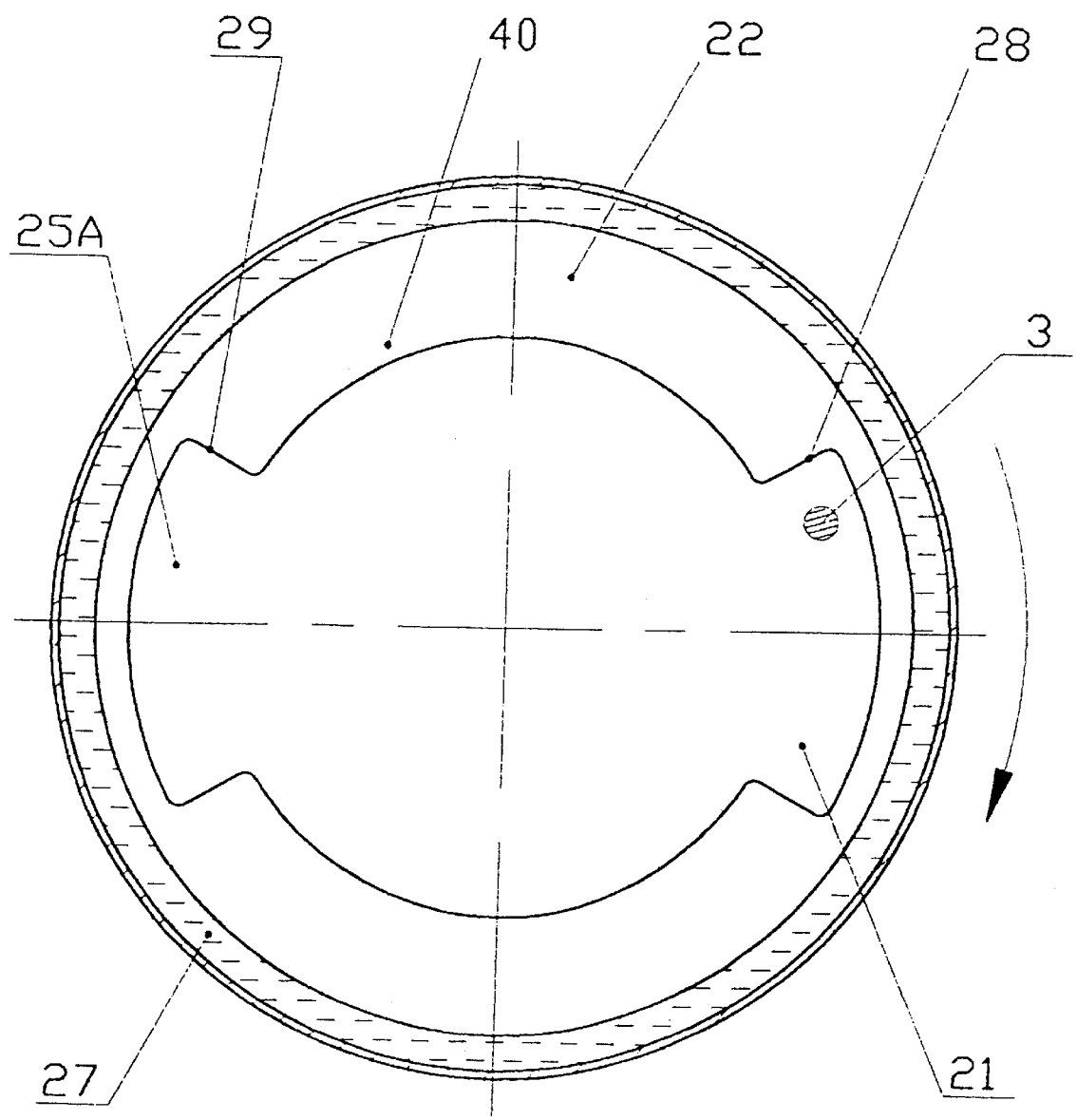
FIG. 4A is a cross-sectional plan view through the spinning head of FIG. 3 showing the annular glass distribution plate.
Figure 4B:
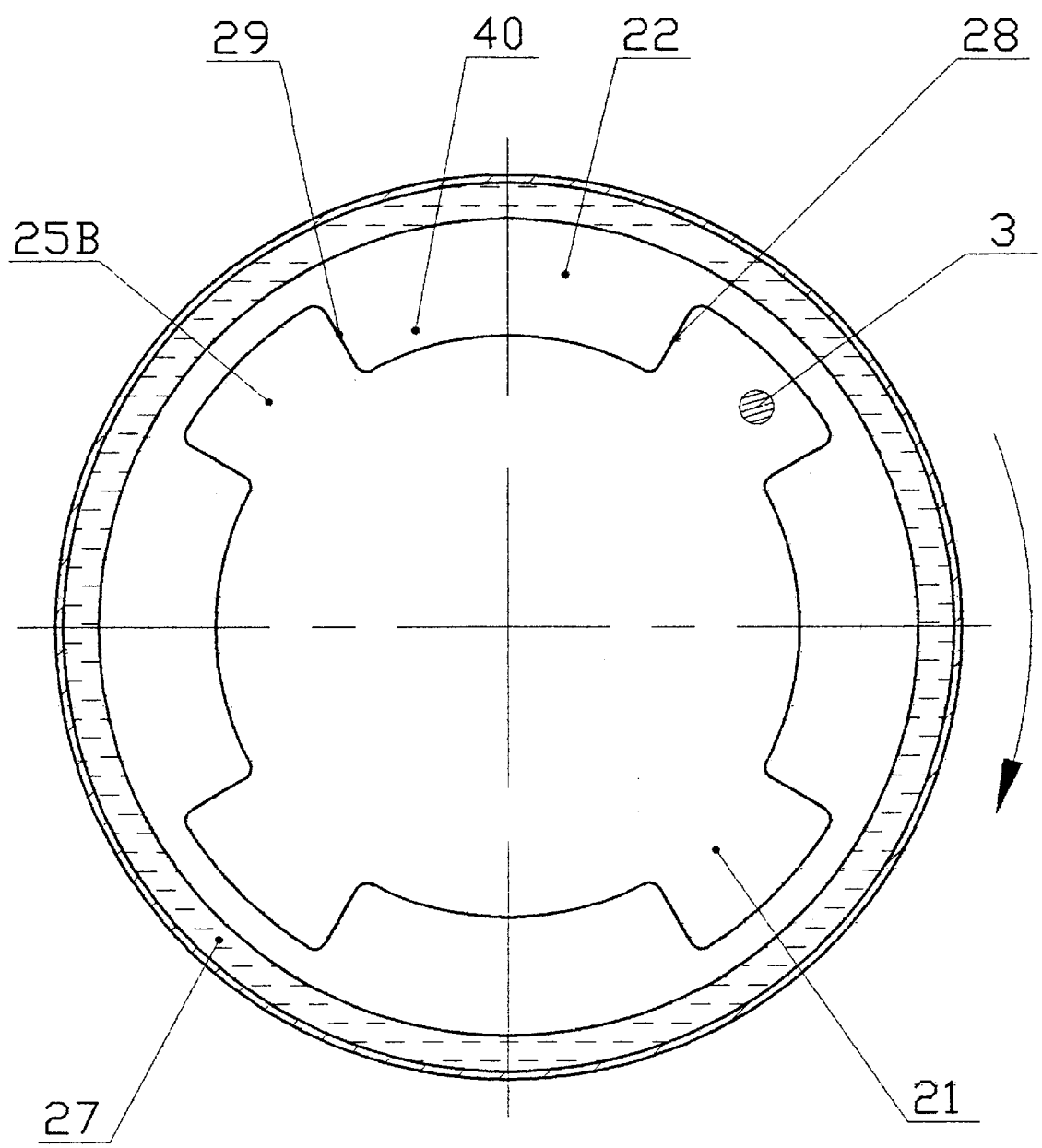
FIG. 4B is a view as in FIG. 4A showing an alternate form of distribution plate.

Referring to FIG. 2, the spinning head 20 of the invention structurally includes a spinning head floor 21, an internal flow distribution flange 22, a top flange 23 and a perforated peripheral rim wall, with a multiplicity of small orifices 44 or holes formed over the outer face surface of the rim wall. Internal flow distribution flange 22 has a set of circumferentially arranged slots or openings 25A, 25B (FIGS. 4A, 4B). Slots 25A, 25B are positioned radially so as to periodically or cyclically align with the descending molten glass stream 3. The function of the flow distribution flange 22 is to subdivide the glass stream, and the overall fibre forming function, into two or more, to some extent, independent and parallel, smaller glass fiber supply systems.

When molten glass stream 3 happens to be directly falling into the opening of a slot 25A, 25B, molten glass for a short time increment is allowed to flow down freely and strike the spinning head floor 21 and intermittently feed the bottom molten glass supply chamber 26 with a fresh portion of molten glass. Due to the high speed rotation of the spinning head 20, this phase doesn't last long, and internal land portion 40 of flange cutting edge 28 momentarily chops and cut-offs incoming glass stream 3, forcing it to land on the inwardly protruding solid portion or land 40 of internal flange 22. During this interval glass stream 3 is physically not allowed to move down beyond the solid barrier imposed by the radially inwardly-projecting section 40 of internal distributor plate 22, and the molten glass stream 3 is temporarily restricted to just hitting, and landing on this internal flange 22. Consequently, during this time increment fresh portions of molten glass will be delivered to the top supply chamber 27.

Internal flange or plate 22 serves as a combined or integrated main molten glass supply flow divider and as a physical top and bottom chamber separator (solid wall). From a strictly structural point of view it also works as an annular stiffener rib for the peripheral extrusion rim wall 24, so one can expect eventual disc face plastic deformation (creep) to be much less pronounced.

When glass stream 3 meets the trailing edge 29 of the land 40 of internal dividing flange 22, the feeding phase into top champer 27 temporarily ends, and the glass stream is admitted to the bottom disc area and lower chamber 26 through corresponding slot segment 25A, 25B. The whole glass stream chopping and top/bottom chamber feeding process cyclically repeats itself after that. Due to some additional factors such as the head's high rotational speed, stream deceleration during landing on a solid flange, inertia effects, the high viscosity of molten glass and the tendency for molten glass to stick or adhere to a hot metal surface, the real picture of stream chopping will not be exactly as described above, and can be reliably established only by experimental means.

This invention is premised on the assumption that external conditions for attenuation or thinning of primary fibres 15 are not as favourable for those extruded from the bottom part of the fiberizing disc as they are for those created in the top part. Some physical reasons for this fact are:

(1) there is a lower temperature in the lower part of the spinning head and corresponding rim orifices 44 (consequently higher viscosity glass has to be attenuated there);

(2) less external aerodynamic drag force is available for fibre attenuation for lower orifices 44A (both the flow of main burner combustion products and the blower compressed air jet gradually lose their velocity with distance due to expansion, intermixing, entrainment of ambient air and partial interaction with a plurality of glass primaries issued from the fiberizing spinning head area above the bottom part of the spinning head 20); and (3) the gaseous fibre-forming environment becomes cooler close to the spinning head bottom, so the effective available fibre attenuation time period becomes shorter in this region due to faster fibre cooling and the corresponding higher rate of glass viscosity gain.

Since fibre forming conditions in the bottom part of spinning head, while lower, are nearly as good as in the upper zone, it is an object of the invention to ease the overall task of the fibre forming process in the bottom portion of spinning head by deliberately reducing the amount of glass subjected to fiberizing in the bottom part, and by partially shifting the load of fibre forming towards the spinning head's upper part. It is believed that, using the invention as described, on the order of 35% to 40% of the total molten glass mass flow rate may be directed to the bottom supply chamber 26; and correspondingly 65% to 60% is fed to the top chamber 27. This is believed to be an appropriate allocation ratio.

This selected mass distribution ratio is easily achieved by simple mechanical means, namely by having circumferential slots 25 formed in internal flange 22 with a corresponding, appropriate, total circumferential coverage angle.

The actual, preferred, circumferential coverage slot angle for a given percentage of total mass flow rate supplied to the bottom chamber may be determined experimentally for a given glass and given process operating conditions. It also depends on whether fewer, but longer circumferential slots, or more but shorter, circumferential slots are provided on the internal dividing flange 22. It has been found that usually the total circumferential slot coverage angle has to be larger than the bottom chamber total pull rate fraction.

This internal flow distributor device doesn't operate as a continuous molten glass stream splitter or divider. Instead, in principle, it operates as a main glass stream chopper, where at a given time instant glass is being supplied either to one chamber or the other, but not both at the same time. Due to this intermittent fashion of operation it is believed preferable to allow more than one feed period for a given chamber per revolution. Thus, FIG. 4B shows a flange 22 with four slots 25B. Increasing the number of slots 25B will reduce variations in the head or height H of glass in the chambers 26, 27 and therefore will also smooth-out the differences in instantaneous pull rates per hole and resulting fibre diameters during the time interval between the subsequent feed periods into a given chamber.

From a mechanical balancing point of view it is better to have an even number of equally angularly spaced identical slots, an exception being possibly having three 120 degrees apart slots. Geometries with an uneven number of identical slots, equally circumferentially spaced, should probably be avoided due to the risks of introducing an element of imbalance in the rotating system.

Figure 4C:
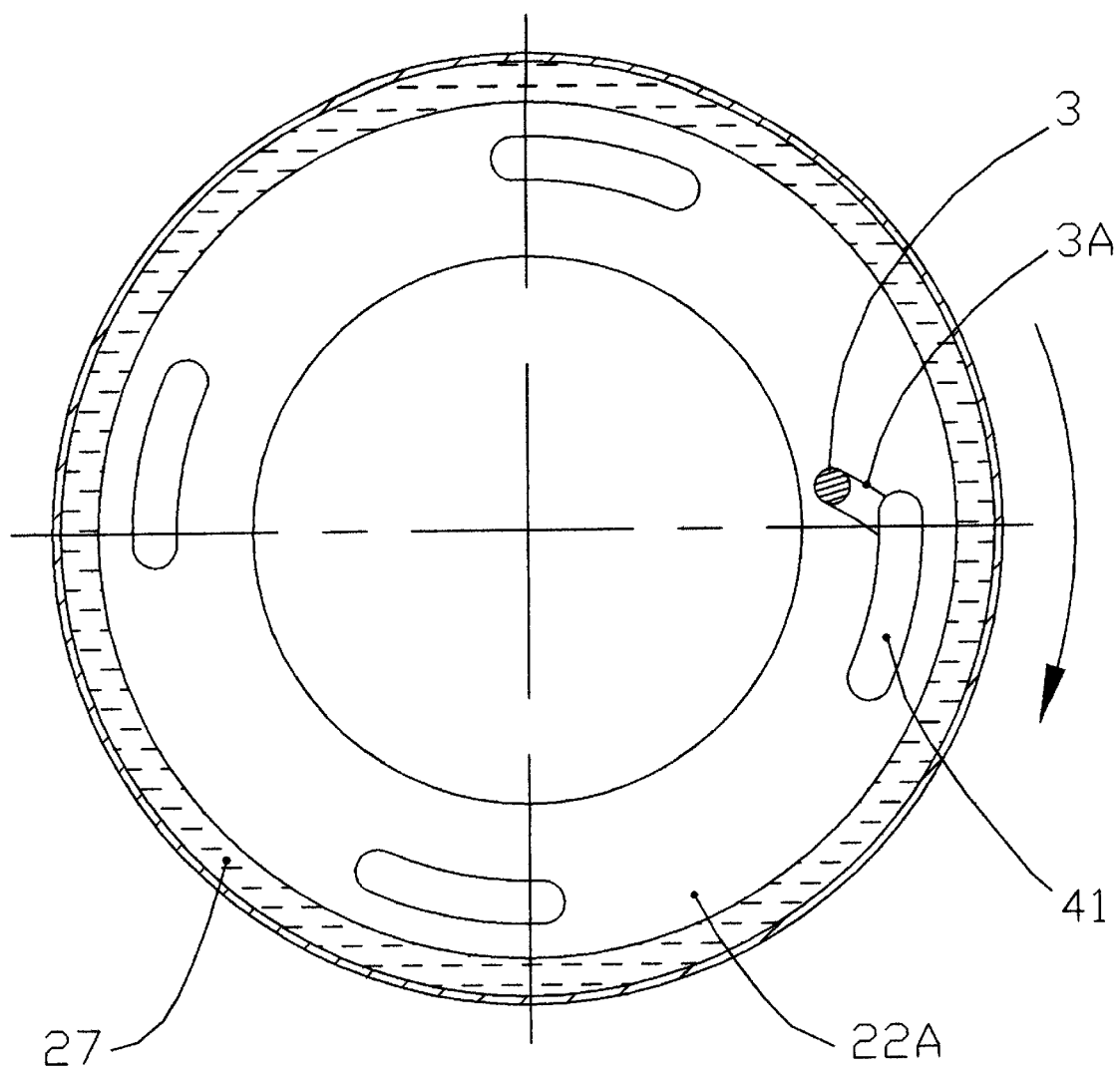
FIG. 4C is a cross-sectional plan view through the spinning head of FIG. 4 showing a distribution plate pierced by holes.
Figure 5:
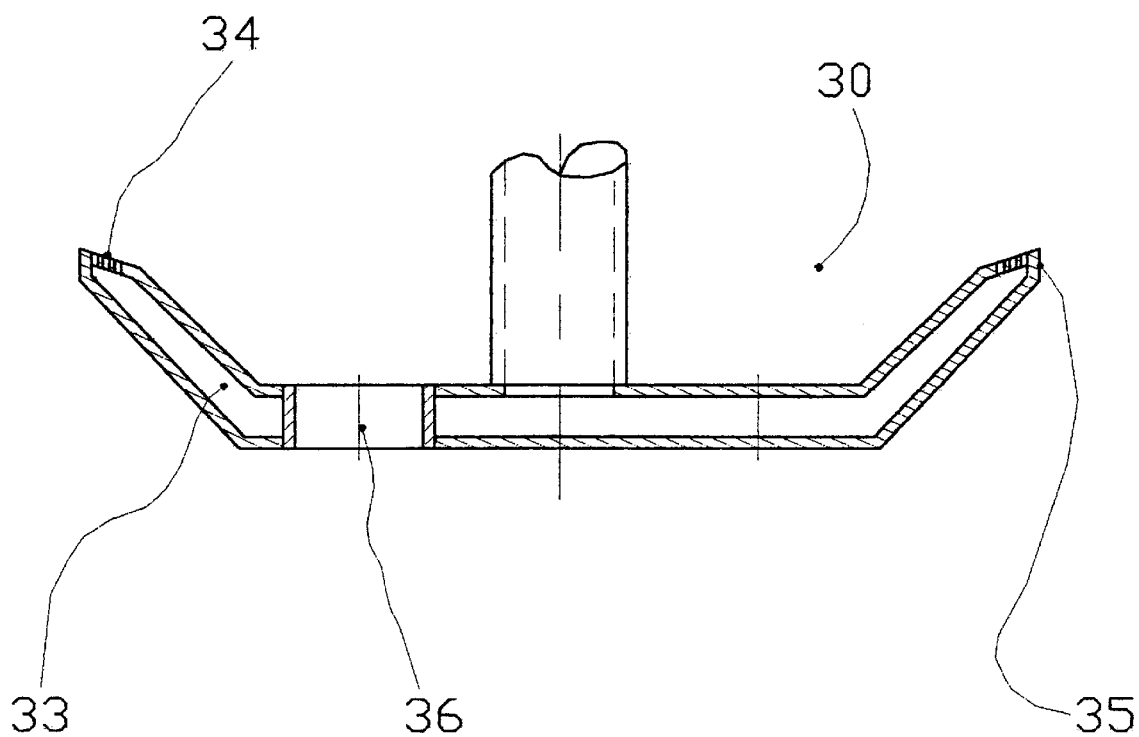
FIG. 5 is a side cross-sectional view of the gas burner located beneath the spinning head in FIG. 2.

As an alternative to having a slotted distributor plate 22 a plate 22A with a solid surface, interrupted by internal openings 41 may be provided as shown in FIG. 4C. In such case the centrifugally-forced radial movement of the glass over the plate surface towards the peripheral wall 24, directs a portion of the flowing glass 3A to be intercepted by the series of holes 41 in the plate 22A that divert glass 3A into bottom chamber 26. Glass flowing between the holes 41 is retained in top chamber 27. Such holes can be additionally equipped with a raised and bevelled or otherwise shaped flow-diverters to make sure that at least a portion of glass flowing towards the slotted area has to divert into the bottom chamber 26. An example of such a configuration is shown in U.S. Pat. No. 2,305,172.

A spinning head of the described construction, with a slotted or perforated internal dividing flange 22 serving as a glass partitioning means, can be considered to some extent as two separate spinning heads connected in parallel. In this spinning assembly, the operation of one fiberizing chamber is to a degree independent of the other one, and it is possible to fiberize with different glass heads H in top and bottom chambers 26, 27. The amounts of molten glass admitted to both parts of the head are set in a predetermined ratio by use of a fixed glass partitioning means and this ratio doesn't change substantially with spinning head age or over its operating life time.

Since in this spinner design not all hot molten glass is at first supplied to the spinner head bottom, as in standard spinning head configuration, an additional external source of heat is preferably provided to keep the spinning head floor area 21 hot enough for proper operation.

This primary objective of delivering sufficient amount of heat to the disc bottom floor 21 is fulfilled by a bottom burner assembly 30. Alternate bottom heater means, such as induction heaters, may be employed. The bottom heater means of preferred burner 30 form serves the following purposes:

(1) it reduces disc bottom heat loss, mainly due to the thermal radiation mechanism of heat transfer, since it functions as a radiation shield;

(2) it slightly extends the effective fibre-forming zone, in both radial and downward axial directions, by partially forcing hot combustion products from the bottom burner tip 35 to enter the already cooled-down, gaseous, fibre-forming environment in the vicinity of the spinning head's bottom edge; and (3) it has some potential to work as a glass fibre veil stabilizer.

Bottom burner assembly 30 is held in place by means of clamping device 31, attached directly to the fiberizing unit's top plate 5 (FIG. 2). A fuel-air (natural gas-air) mixture is delivered down through pipe 32 into bottom burner chamber 33. Support pipe 32 is mounted inside hollow spinning head driving shaft 19, co-axially with it. Gaseous combustible mixture flows out from burner chamber 33 through an array of small gas orifices 34 located in burner tip 35. At the exit gas orifice 34 the mixture ignites and, in form of continuous circular flame, impinges upon the spinning head bottom 21. By adjusting the combustible mixture's supply pressure one can influence not only the bottom burner's firing power, but also to a degree, the location of the heat delivery area on the spinning head floor 21. Fresh and hot combustion products partially enter the bottom region of the main fibre-forming zone, close to the spinning head's bottom edge. The continuous supply and flow of cold combustible mixture through bottom burner 30 to a large extent prevents combustion inside bottom burner 30.

Bottom burner has venting holes 36 for pressure equalization between the areas directly above and below the bottom burner structure, this also helps to stabilize the bottom burner flame. Also the chances of igniting combustible mixture inside bottom burner chamber 33 are slimmer since there is no stagnant air pocket right in contact with the hot spinning head bottom 21 to gradually, over time, heat and raise its temperature to the level sufficient to initiate the combustion process inside bottom burner chamber 33.

The bottom burner geometry just described has a closed structure (dish or bowl like) to simultaneously serve also as a bottom radiation shield for fiberizing spinning head bottom 21. To some extent it also performs the function of a fibre veil stabilizer. One can of course envision simplifying this design to an open structure ring burner, wherein a circular burner manifold is mechanically supported by and supplied with combustible mixture through some radial spokes connected to central supply and support pipe. This last design, however, doesn't help to reduce spinning head bottom radiative heat losses. It also is a much easier target for fibre build-up and accumulation.

The bottom burner configurations described above were non-rotating. With the non-rotating bottom burner configuration there is a tendency for fibre trapped in an air recirculation bubble (vortex) right underneath the spinning head burner to move upward, occasionally striking the bottom burner's solid and motionless wall, and eventually more or less loosely attach to it. Over the longer period of time of uninterrupted fiberizer operation, some fibre structure directly attached to the bottom burner solid wall will be created as a result of ongoing fibre accumulation process.

It is equally possible to build a rotating bottom burner, mechanically integrated with or attached to (bolted) a suitable spinning head mounting hub equipped with a central bore to serve as a combustible mixture supply channel. There are some advantages of using a rotating bottom disc burner, as for example less pronounced fibre accumulation on its solid rotating surfaces. There is, therefore, less cleaning needed, less production process interruptions, also less chances for interference with the fibre veil forming process. On the negative side, this design is definitely more involved from a strictly mechanical point of view: there is a need for using a rotating union, possibly some additional dynamic balancing is required, and an enhanced bearing support system is probably needed as well.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed are as follows:

1. A fibre spinning head comprising:
   (1) a circumferential extrusion rim with a spinning face perforated by extrusion orifices;
   (2) feed means for delivering molten extrusion material within said head;
   (3) two vertically displaced, upper and lower non-intercommunicating interior compartments located within said head on the inner side of the extrusion rim and positioned to receive molten material from the feed means, each of the compartments communicating with distinct, separated non-overlapping zones of extrusion orifices formed on the spinning face,
   wherein the feed means allocates differing quantities of molten material to the respective compartments to provide greater quantities of molten extrusion material to be fed to the upper compartment than to the lower compartment and wherein said feed means comprises a glass delivery means by which a molten glass stream is directed alternately into the respective upper and lower compartments in a specific mass distribution ratio to provide different mass flow rates for the respective zones of extrusion orifices.

2. A fiber spinning head as in claim 1 wherein the glass delivery means comprises a circularly rotating, flow directing surface that intercepts the glass stream intermittently as the spinning head rotates.

3. A fiber spinning head as in claim 1 wherein the glass delivery means comprises a plate positioned between the upper and lower compartments to intercept a single stream of molten extrusion material, said plate being perforated by openings that will allow a portion of the glass stream to flow from the upper to the lower compartments.

4. A fibre spinning head as in claim 1 comprising temperature control means to provide a temperature controlled environment for the lower compartment.

5. A fibre spinning head as in claim 4 wherein the temperature control means comprises a gas-fired burner located beneath the spinning head.

6. A fiber spinning head for extrusion of fiber-forming material said head having an extrusion rim which is bifurcated into at least two portions by at least one inner horizontal plate to provide at least two non-overlapping, upper and lower fibre-forming zones over at least a portion of the height of the extrusion rim and feed means for delivery of differing quantities of extrusion material at differing rates to the respective zones and wherein the feed means delivers extrusion material alternately to the fibre-forming zones.

7. A fiber spinning head as in claim 6 wherein said feed means comprises openings formed in said plate to allow the flow of fiber-forming material therethrough.

* * * * *